United States Patent [19]
Graham

[11] Patent Number: 6,095,539
[45] Date of Patent: Aug. 1, 2000

[54] THREE PERSON BICYCLE

[76] Inventor: Sean Graham, 530 E. Beaver Ave., State College, Pa. 16801

[21] Appl. No.: 09/015,177

[22] Filed: Jan. 29, 1998

[51] Int. Cl.[7] ..................................................... B62K 3/14
[52] U.S. Cl. ............................................................ 280/231
[58] Field of Search .................................. 280/230, 231, 280/222, 281.1

[56] References Cited

U.S. PATENT DOCUMENTS 4,600,206   7/1986   Di Paolo ................................. 280/231

FOREIGN PATENT DOCUMENTS 2907   of 1898   United Kingdom ................... 280/231
2095631   10/1982   United Kingdom ................... 280/231

*Primary Examiner*—Brian L. Johnson
*Assistant Examiner*—Avraham H. Lerner
*Attorney, Agent, or Firm*—Ted Masters

[57] ABSTRACT

A three-person bicycle (20) having two of the riding positions situated between a front wheel (22) and a rear wheel (26), and the third riding position situated behind the rear wheel (26). Bicycle (20) includes a front first seat (34), a middle second seat (36), and a third rear seat (38) connected to a frame (32). Front seat (34) and second seat (36) are located on frame (32) between front axle (24) and rear axle (28). Third rear seat (38) is connected to frame (32) behind rear axle (28) and rear wheel (26).

10 Claims, 6 Drawing Sheets

THREE PERSON BICYCLE

TECHNICAL FIELD

The present invention pertains to bicycles, and in particular to a bicycle which is ridden by three people, and is specifically designed to maintain high speeds for prolonged periods of time.

BACKGROUND ART

Bicycles of a multitude of styles, shapes, and sizes are well known in the art. Bicycles are the fastest and most popular means of human powered transportation, and are capable of sustaining speeds of nearly 35 miles per hour over flat ground. Millions of dollars are spent every year in an attempt to develop faster bicycles. Three basic factors affect the speed at which a bicycle travels. These are: (1) the amount of power delivered by the rider(s), (2) the frictional forces acting upon the bicycle (wind, rolling and mechanical drag), and (3) the weight of the bicycle and rider(s). Therefore, to create the fastest bicycle possible, power and aerodynamics must be maximized, while friction and weight must be minimized. The power input is controlled by the number and physical condition of the riders, while the friction and weight are controlled by technology and aerodynamics. Increasing the number of riders on the bicycle to two or three increases the power input, but correspondingly increases the friction and weight. However, if the riders are closely aligned in the direction of travel, the average aerodynamic drag per rider is significantly reduced much as it is when a single rider "drafts" by getting immediately behind another rider. In fact, putting two or three riders on one bicycle is much more efficient than drafting on individual bicycles because the riders are situated much closer (nearly in contact with one another) than would be physically possible on individual bicycles. For example, when riding a three person bicycle, it is estimated that the aerodynamic drag is only 1.4 to 1.8 times (not three times) as much as that acting on an individual bicycle at the same speed. This is due to the low pressure tunnel created for the second and third riders by the first or front rider breaking the wind. The important result is that with three riders, each rider has to overcome approximately one-half the aerodynamic drag force that an individual rider would encounter on a standard individual bicycle traveling at the same speed.

While the reduced aerodynamic drag force per rider of multiple rider bicycle is indeed advantageous, there do exist limiting factors which restrict the number of riders on a practical two-wheeled vehicle. The increased wheel base necessary to support additional riders makes the bicycle difficult to both construct and control. Because of the long wheelbase, a large and heavy frame is required to support the weigh of the three riders without intolerable flexing. Such a long wheelbase three-person bicycle is shown in FIG. 1.

DISCLOSURE OF INVENTION

The present invention is directed to an improved three-person bicycle which overcomes the difficulties encountered with long wheelbases. In the present invention, the wheelbase is shortened by placing the rear wheel between the second and third riders. In this configuration, the bicycle handles like a two-person (tandem) bicycle, but has the power advantage a third rider. With the rear wheel positioned behind the third rider as in FIG. 1, the bicycle has a large turning radius which renders it difficult to steer, control, and balance. Conversely, the shortened wheelbase of the present invention reduces the turning radius so that the bicycle handles exactly like a tandem. The response of the present invention to the controlling actions of the riders is more pronounced, making the bicycle considerably easier to balance and steer. An objective of the present invention is to break long distance human powered speed records. A proposed name for the present invention is TRIDEM.

The placement of the second wheel between the second and third riders also improves the structural properties of the present invention. By supporting the rear of the frame between the second and third riders, the weight of the riders is advantageously distributed across the frame truss. Flexing in the middle of the frame of the present invention is greatly reduced, as compared to the high flexing of the FIG. 1 frame (caused by the longer wheelbase). The high flexing of the longer wheelbase bicycle has two major disadvantages. First, it increases the cyclical loading fatigue stresses on the frame. And second, valuable rider energy is absorbed by the dampening of vibrations within the flexing frame. The present invention reduces flexing and therefore mitigates these two disadvantages. Additionally, the frame of the present invention can be constructed with less material, thereby reducing weight and increasing performance. One might think that this design could lead to the bicycle "wheelieing", or not placing sufficient pressure on the front wheel. Although, about 70% of the bicycle's weight is supported on the rear wheel, the front wheel still supports a minimum of about 70 lbs. even if all three riders are leaning back as far as possible.

Another unique feature of the present invention is a down tube which extends from the head tube to the bottom connection tube between the first and second crank housings. The down tube contributes to the both the vertical and lateral stiffness of the bicycle, while additionally providing support to the front drive train. The resulting frame truss configuration is considerably stronger and less flexible than those designed with a standard down tube as in FIG. 1.

The present invention also includes movable handle bar supports for the second and third riders. These movable supports, which can be selectively positioned along the crossbar, allow the bicycle to be quickly and easily modified to accommodate riders of different sizes (such as small children, by positioning the supports toward the associated seat). This feature is also useful in long distance riding wherein a rider rotation scheme is employed. The handle bar supports for the first and second riding positions can be quickly and easily adjusted to suit the needs of the individual riders.

The present invention additionally incorporates a crank mechanism for the third rider, wherein the third rider can rest his/her legs while the other riders pedal. This yields advantages in long distance rides when a rider rotation scheme is utilized to maximize performance.

The present invention also includes first, second, and third seat tubes for the front, middle and rear riders respectively which form progressively decreasing angles with the horizontal. The first seat tube is the most vertical, the rear seat tube is the most horizontal, with the second seat tube having an angle between the two. This unique configuration optimizes the performance of the riders on a rotation scheme. Each position on the bicycle has a slightly different geometry and feel to the rider. Therefore, by periodically switching positions on the bicycle, the riders can endure longer because each position works the riders muscles in a slightly different way. The front position with its steep angled seat tube places the rider in an aggressive aerodynamic position like that of a sprint bicycle. The geometry of the rear position is more conducive to relaxed distance riding.

In accordance with a preferred embodiment of the invention, a three-person bicycle includes a front wheel having a front axle, a rear wheel having a rear axle, a longitudinal axis therebetween, and a frame connecting the two axles of the two wheels. A first seat is connected to the frame between front axle and the rear axle. A second seat is connected to the frame between the front axle and the rear axle, the second seat being located behind the first seat. A third seat is connected to the frame behind the rear axle, so that the rear wheel is substantially between the second and third seats.

In accordance with an important aspect of the invention, the frame includes a cross bar which is oriented approximately parallel to the longitudinal axis. The cross bar is connected to a head tube which is located above the front wheel. The frame has a first crank housing located below the first seat, and a second crank housing located below the second seat. A bottom connection tube connects the first crank housing and the second crank housing, the bottom connection tube being approximately parallel to the longitudinal axis, and the bottom connection tube having a central portion. A down tube connects the central portion of the bottom connection tube to the head tube.

In accordance with an important feature of the invention, the down tube forms an angle of approximately 25° with the cross bar.

In accordance with another important aspect of the invention, a first handle bar support for a person occupying the second seat is movably connected to the cross bar, so that the first handle bar support may be longitudinally moved and locked in a desired position along the cross bar.

In accordance with another important feature of the invention, a second handle bar support for a person occupying the third seat is movably connected to the cross bar, so that the second handle bar support may be longitudinally moved and locked in a desired position along the cross bar.

In accordance with an important aspect of the invention, the first seat is supported by a first seat tube which has a first angle with horizontal. The second seat is supported by a second seat tube which has a second angle with the horizontal, the second angle being less than the first angle. And, the third seat is supported by a third seat tube which has a third angle with the horizontal, the third angle being less than the second angle.

Other features and advantages of the present invention will become apparent from the following detailed description, taken in conjunction with the accompanying drawings, which illustrate, by way of example, the principles of the invention.

MODES FOR CARRYING OUT THE INVENTION

Figure 1:
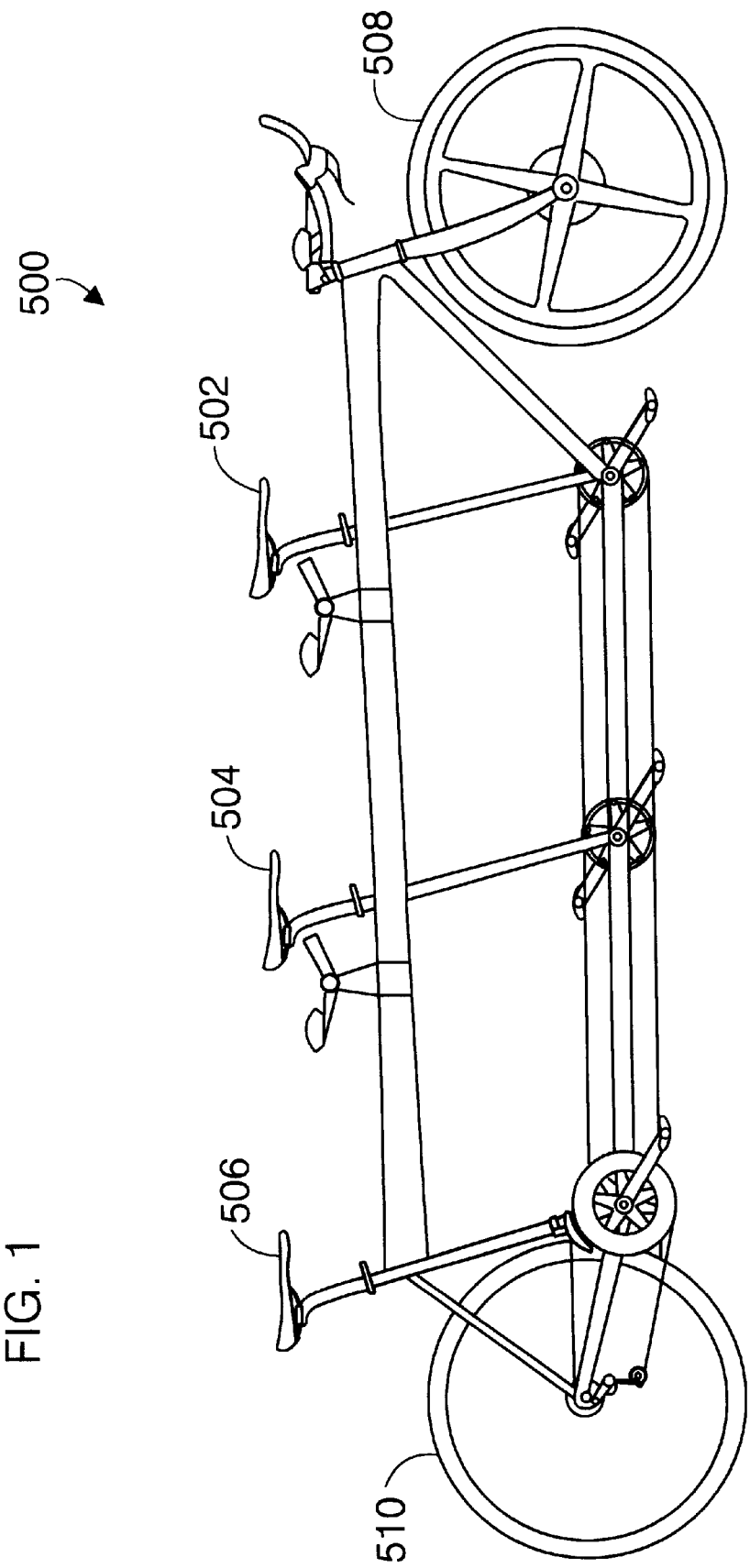
FIG. 1 is a side elevation view of a three-person bicycle in which all of the riders are positioned between the front and rear wheels.

Referring initially to FIG. 1, there is illustrated a side elevation view of a three-person bicycle 500 wherein all of the riders are positioned on seats 502, 504, and 506 which are located between the front and rear wheels 508 and 510.

Figure 2:
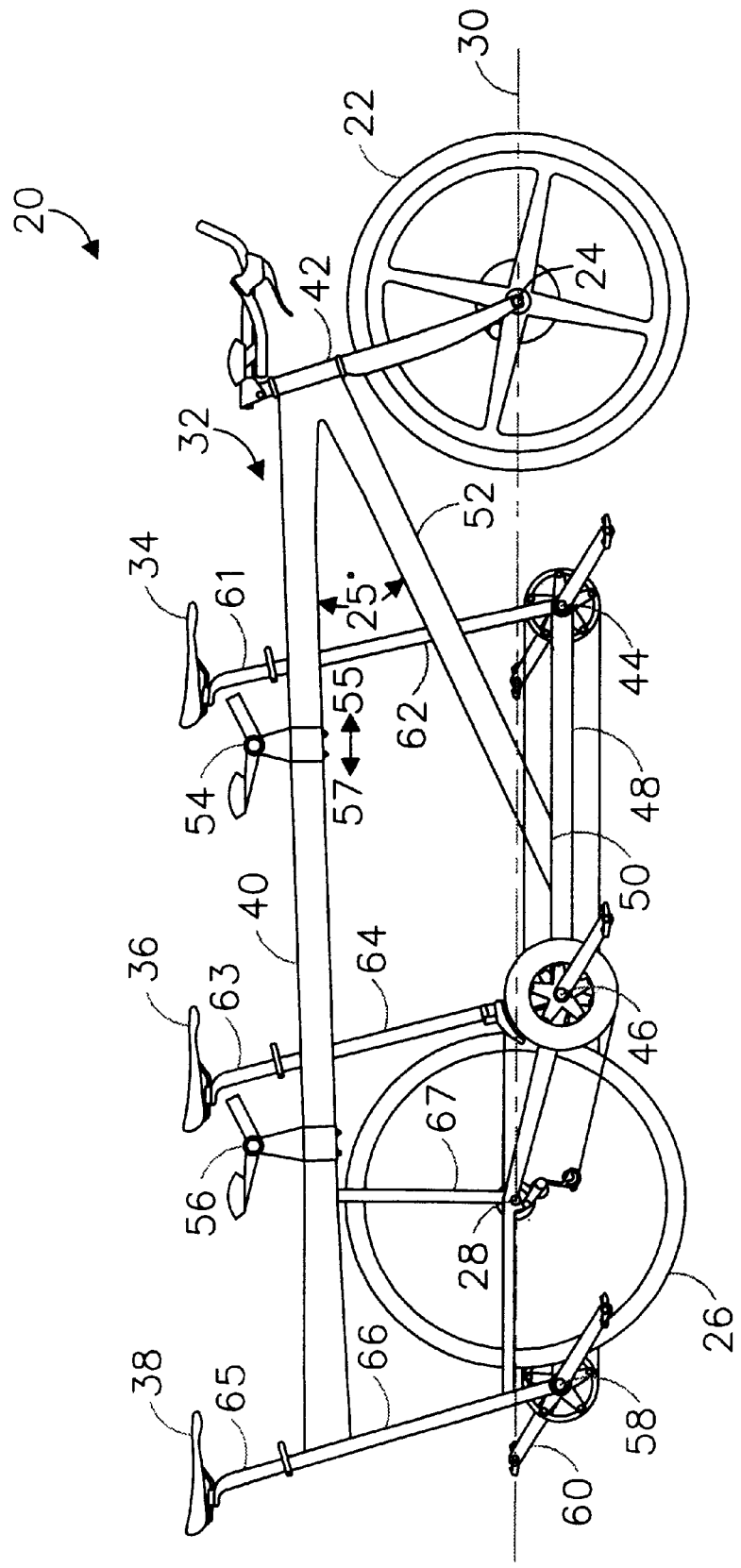
FIG. 2 is a side elevation view of a three-person bicycle in accordance with the present invention.
Figure 3:
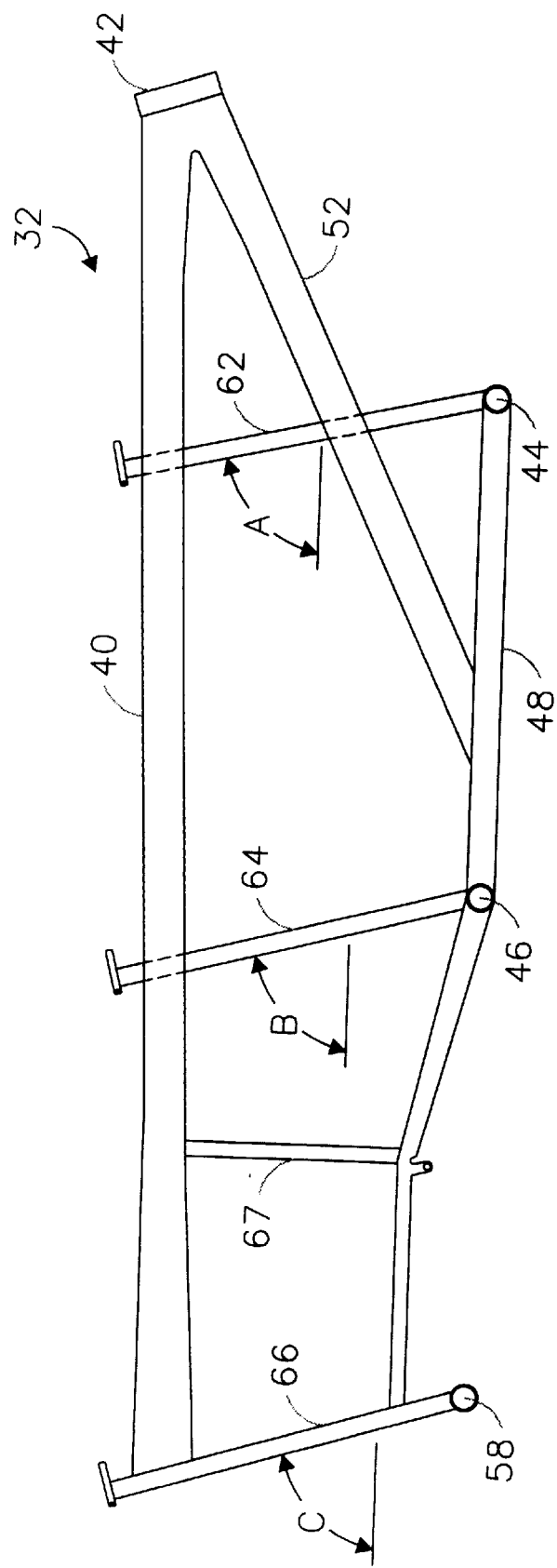
FIG. 3 is an enlarged side elevation view of the frame of the bicycle.

Referring now to FIG. 2, there is illustrated a side elevation view of a three-person bicycle in accordance with the present invention, generally designated as 20. FIG. 3 is an enlarged side elevation view of the frame 32 of bicycle 20. Because of the placement of the third rider behind the rear wheel, bicycle 20 has the wheelbase of a tandem bicycle with a three-rider capacity. Bicycle 20 includes a front wheel 22 having a front axle 24, a rear wheel 26 having a rear axle 28, and a longitudinal axis 30 passing between the front and rear axles 24 and 28 respectively. A frame 32 connects front wheel 22 and rear wheel 26. A first seat 34 is longitudinally disposed upon frame 32 between front axle 24 and rear axle 28 (as measured parallel to longitudinal axis 30). A second seat 36 is longitudinally disposed upon frame 32 between front axle 24 and rear axle 28, second seat 36 being behind first seat 34. A third seat 38 is longitudinally disposed upon frame 32 behind rear axle 28, so that third seat 38 is located substantially behind rear wheel 26.

Frame 32 has a cross bar 40 which is oriented approximately parallel to longitudinal axis 30. Cross bar 40 is responsible for most of bicycle's 20 vertical and lateral rigidity, and therefore has a large diameter as can comfortably fit between a rider's legs. In a preferred embodiment, the center portion 41 of cross bar 40 has a substantially circular cross section with a diameter d of approximately 2.5 inches (refer also to FIG. 4). Cross bar 40 is connected to a head tube 42 which is generally disposed above front wheel 22. Both ends of cross bar 40 gradually become vertically narrow (elliptical) so that (1) they may be welded to the smaller diameter rear seat tube 66 and head tube 42, and (2) increase the vertical stiffness of these areas. Cross bar 40 is at its roundest (substantially circular in cross section) in the middle of bicycle 20 where lateral (side-to-side) flexing is the greatest. First 62 and second 64 seat tubes pass directly through cross bar 40, and are welded at the intersection points. Undesirable bowing or sagging of the middle or second rider is prevented by the cross bar 40 and the rider's location. The weight of the second rider, where one might expect to have the most significant flexing, is completely supported by the moment on the cross bar 40 created by the third or rear rider about a vertical support tube 67. Thus cross bar 40 and the entire bicycle 20 is stiff despite the weight of the three riders.

Frame 32 has a first crank housing 44 which is generally disposed below first seat 34, and a second crank housing 46 which is generally disposed below second seat 36. A bottom connection tube 48, oriented approximately parallel to longitudinal axis 30, connects first crank housing 44 and second crank housing 46. Bottom connection tube 48 is as wide as possible to provide additional lateral support in the middle of bicycle 20 where it is most important. Bottom connection tube 48 has a central portion 50.

A down tube 52 connects central portion 50 of bottom connection tube 48 to head tube 42. This is in contrast to a traditional bicycle, wherein the down tube only extends from the heat tube directly to the first crank housing. By connecting the down tube 52 behind the first crank housing 44, the flame mass is increased perpendicular to the vertical. This increases both the vertical (up and down) and lateral (to the rider's right and left) stiffness of bicycle 20 (refer to FIGS. 6 and 7 respectively). In a preferred embodiment, down tube 52 forms an angle of approximately 25° with cross bar 40.

Another advantage of bicycle 20 is found in the handle bar supports for the second and third riding positions. A first handle bar support 54 for the person occupying the second seat 36 is movably connected to cross bar 40 so that it may be longitudinally moved in either direction 55 or 57 and locked in a desired position along cross bar 40. Similarly, a second handle bar support 56 for the person occupying the third seat 38 is movably connected to cross bar 40 so that it may be longitudinally moved and locked in a desired position along the cross bar 40. In a preferred embodiment, the first 54 and second handle bar supports 56 include a vertical stem which is clamped to cross bar 40 by bolts.

Frame 32 of bicycle 20 further includes a third crank housing 58 disposed generally below third seat 38, and a third crank arm 60 rotatably disposed within third crank housing 58. A crank mechanism permits the third rider to rest while the other two riders pedal, by allowing relative rotation of crank arm 60 and the chain ring in only one direction.

First seat 34 is supported by a first seat post 61 which is received by a first seat tube 62 having a first angle A with the horizontal. First seat tube 62 extends from seat 34, through cross bar 40, to first crank housing 44. Second seat 36 has a second seat post 63 which is received by a second seat tube 64 having a second angle B with the horizontal. Second seat tube 64 extends from second seat 36, through cross bar 40, to second crank housing 46. And, third seat 38 is supported by a third seat post 65 which is received by a third seat tube 66 having a third angle C with the horizontal. Angle B is less than angle A, and angle C is less than angle B. In a preferred embodiment, first angle A is approximately 77°, second angle B is approximately 75°, and third angle C is approximately 73°. The angles of seat tubes 62, 64, and 66 are selected to maximize long distance speeds for in rider rotation scheme, wherein each position on bicycle 20 has its own distinct function an geometry. Each rider will spend a predetermined amount of time in each position before rotating. The first or front rider will rotate to the second middle position, the second rider will rotate to the rear position, and the last or rear rider will rotate to the front position. Because the riders spend the same amount of time in all positions, each rider ideally should be approximately the same height in order to minimize individual geometry customizing (e.g. the handlebar supports) during rider rotation.

The front rider has the most important job on bicycle 20, that of the windbreaker. This position is designed to maximize the aerodynamics of bicycle 20, keep bicycle 20 on the road, and harness all of the riding team's power. The angle of first seat tube 62 is therefore similar to that of a time trial bicycle, a steep approximate 77°, which puts the front rider in a powerful forward and aerodynamic position. This position allows the front rider to get low, making good use of his aero-bars, retain an open angle between his/her torso and thighs to provide enough room at the top of the pedal stroke, so that the fastest possible petal stroke can be sustained.

The second rider is in a more relaxed position. Aerodynamics are not as important as for the first rider, therefore the second rider can sit up a little higher. The second or middle position is also the position of moderate rather than maximum power output. The geometry of the second position is therefore more like that of the average road bicycle with the second seat tube 64 relaxed back to about 75°. In the second position, the top tube 40 allows just enough room to duck behind the first rider into an aerodynamic position.

The third or rear rider is in the recovery, or least demanding position on bicycle 20. This rider can contribute as much as the other two riders, or simply relax and enjoy the ride by utilizing the neutral feature of the third crank arm 60. The third rider also enjoys a little bit more cross bar 40 length than the second rider, and a more relaxed 73° third seat tube 66 angle.

Figure 4:
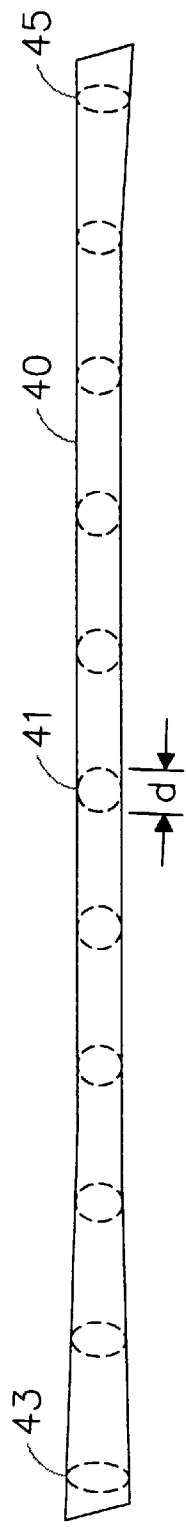
FIG. 4 is an enlarged multiple cross sectional view of a cross bar.

FIG. 4 is an enlarged multiple cross sectional view of cross bar 40 showing the various cross sectional shapes. The center portion 41 has a substantially circular cross section, while end portions 43 and 45 gradually taper to an elliptical cross section.

Figure 5:
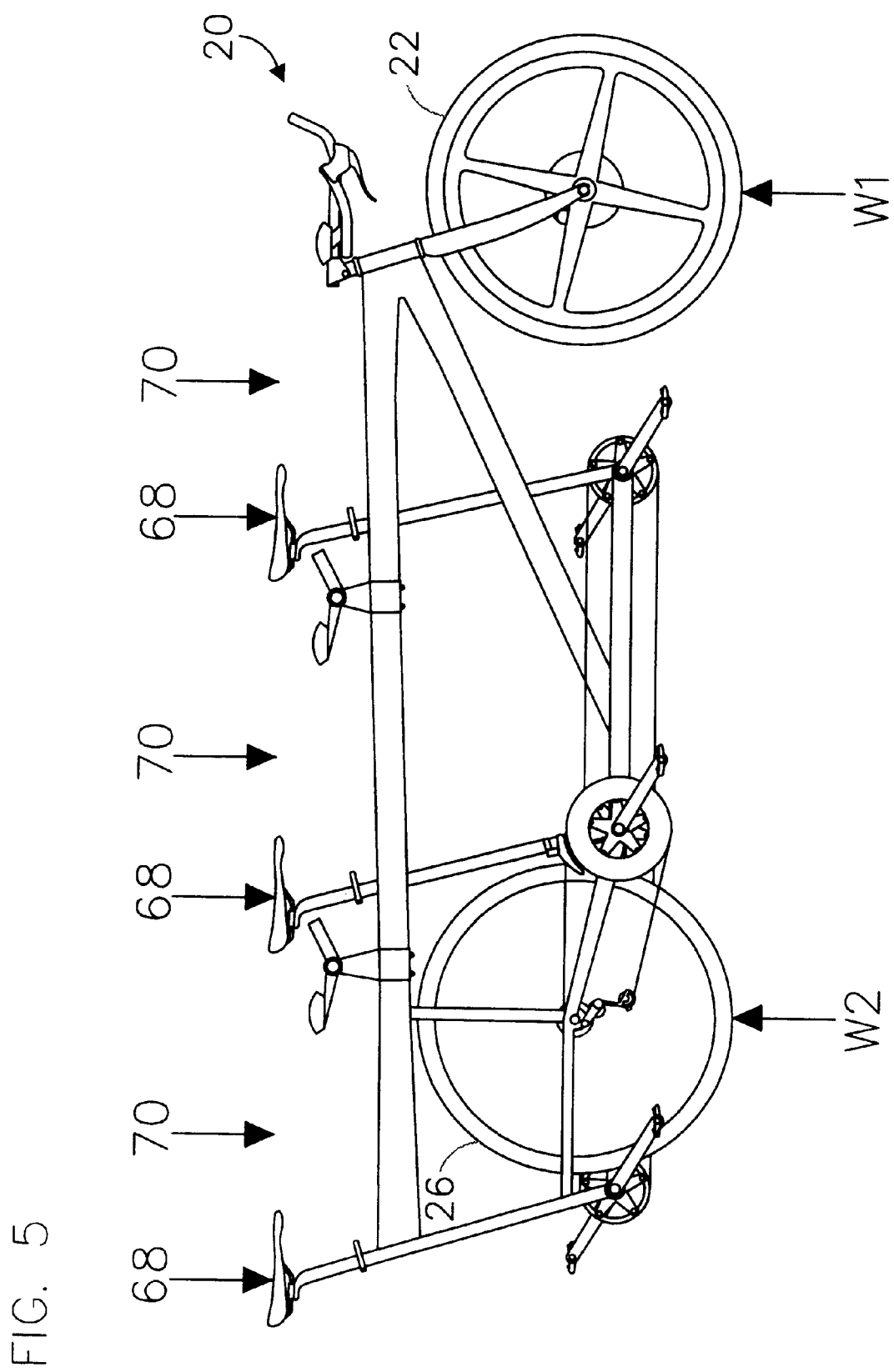
FIG. 5 is a side elevation view of the three-person bicycle showing the apportionment of rider weight.

FIG. 5 is a side elevation view of three-person bicycle 20 showing the apportionment of rider weight. Arrows 68 represent the center of gravity of a 170 lb. rider who is sitting straight up vertically. Even in this position there is still plenty of weight W1 on the front wheel 22 (73 lbs.). This uneven wheel pressure would actually help the front rider to maneuver the bicycle 20, because it gives the ability to hop the front wheel 22 over uneven surfaces or obstacles. In order for the front wheel 22 to lose all contact with the ground, the front rider would have to be absent.

Arrows 70 indicate each rider's center of gravity in an average relaxed riding position. Front wheel 22 now supports considerably more weight W1 (157 lbs.). The loads on front wheel 22 are within the design tolerances of sturdy mountain bicycle wheels. The rear wheel 26 however supports a weight W2 of between 350 and 440 lbs. for an average rider having a weight of 170 lbs. This is more weight than an average wheel designed for one rider can accommodate. Therefore, the present invention will require a custom rear wheel 26 specifically designed for the increased weight.

Figure 6:
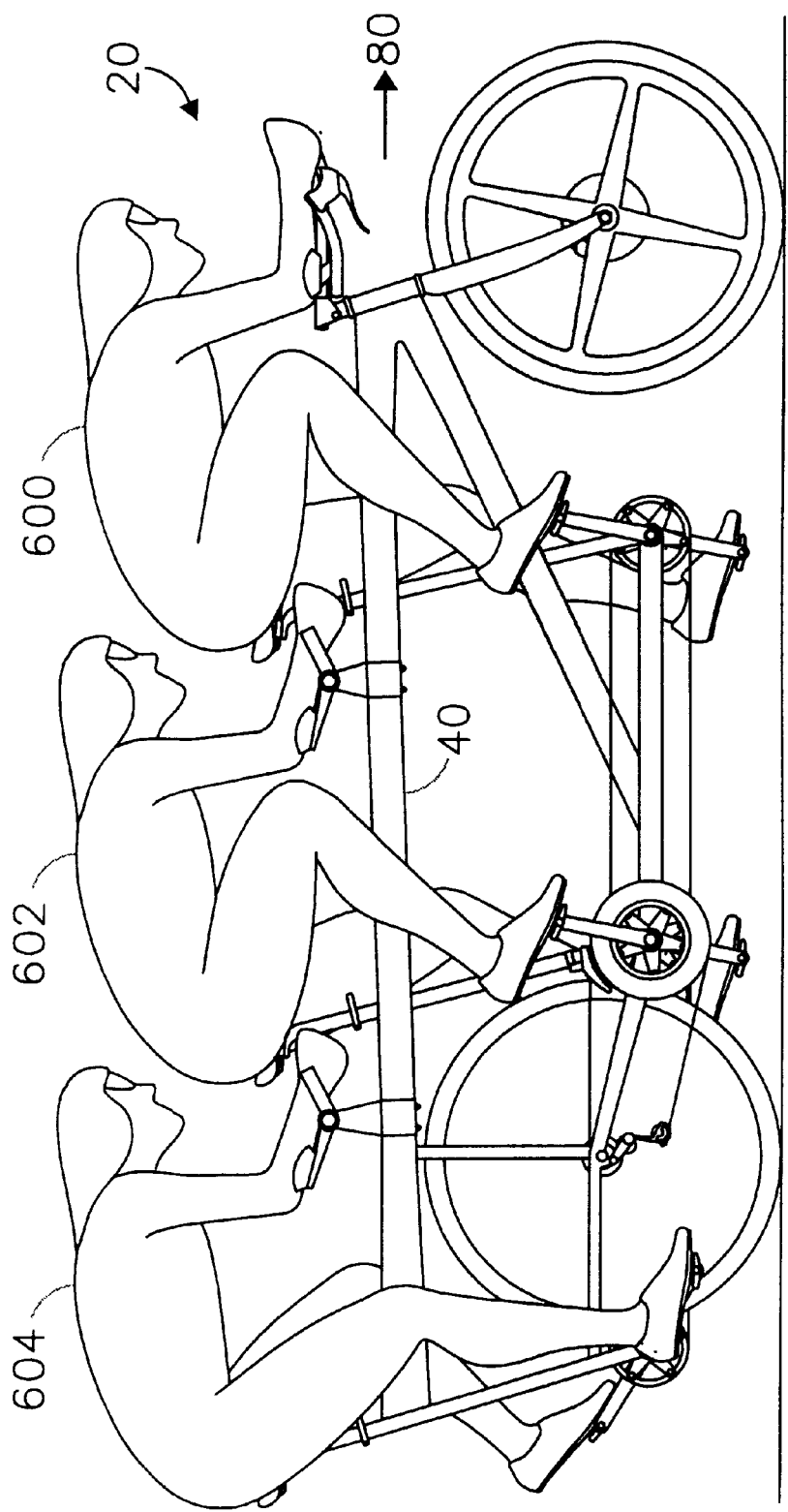
FIG. 6 is a side elevation view of the three-person bicycle with three riders; and, FIG. 7 is a top plan view of the three-person bicycle.
Figure 7:
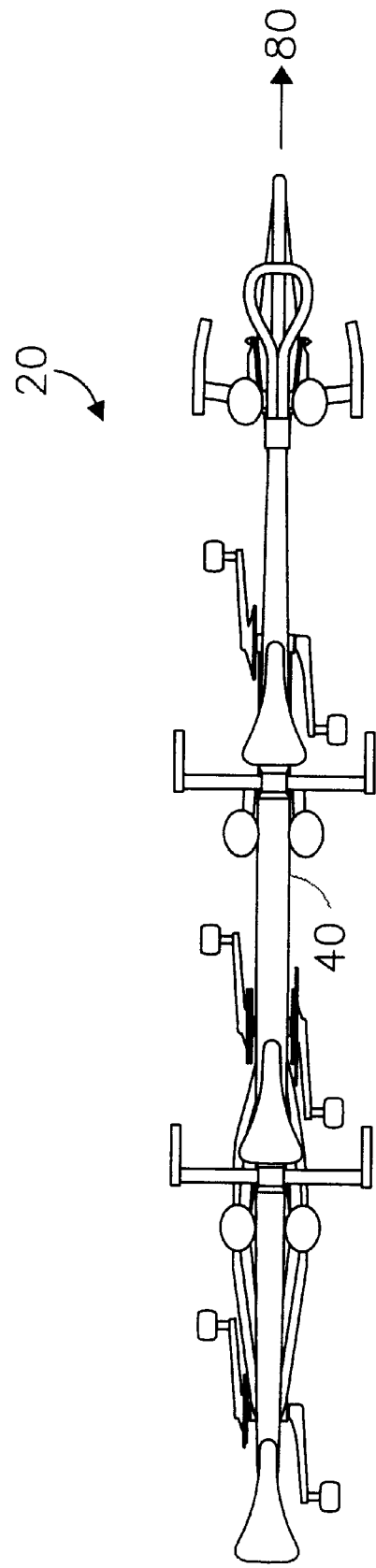

FIG. 6 is a side elevation view the three-person bicycle 20 with three riders in their riding positions, and FIG. 7 is a top plan view of the three-person bicycle 20. The three riders are a first or front rider 600, a second or middle rider 602, and a third or rear rider 604. The three riders 600, 602, and 604 are spaced along cross bar 40 so as to be vertically and laterally aligned with the direction of bicycle 20 motion 80.

Frame 32 of the present invention is designed to fit three riders comfortably, maximize each rider's performance and aerodynamics, and minimize bicycle 20 weight and flex. 6000 series aluminum would be a most economical means of achieving these goals. Titanium or carbonfiber are more expensive alternatives.

With three individual power suppliers, the present invention demands a rather complex drive system. The components on the left side of the bicycle connect the riders, while the components on the right side of the bicycle deliver the power to the rear wheel and change gears. Two chains extend from the middle position on the left side of the bicycle (which must therefore have two parallel chain rings) to both the front and rear cranks. Each chain ring on this side is the same size so that each rider pushes the same gear. The drive train on the right side of the bicycle is identical to an ordinary touring bicycle except that it has some larger gears for fast downhills.

Finally, due to the significant loads (possibly over 400 lbs.) experienced by the rear wheel 26, the support tubes of frame 32 which support the rear wheel 26 are more substantial than those of other bicycles.

The preferred embodiments of the invention described herein are exemplary and numerous modifications, dimensional variations, and rearrangements can be readily envisioned to achieve and equivalent result, all of which are intended to be embraced within the scope of the invention.

I claim:

1. A three-person bicycle, comprising:

a front wheel having a front axle;

a rear wheel having a rear axle;

a longitudinal axis passing between said front axle and said rear axle;

a frame connecting said front wheel and said rear wheel;

a first seat longitudinally disposed upon said frame between said front axle and said rear axle;

a second seat longitudinally disposed upon said frame between said front axle and said rear axle, said second seat being behind said first seat; and, a third seat longitudinally disposed upon said frame behind said rear axle, so that said third seat is located entirely behind said rear wheel.

2. A three-person bicycle according to claim 1, further including:

said frame having a cross bar oriented approximately parallel to said longitudinal axis;

said cross bar connected to a head tube disposed above said front wheel;

said frame having a first crank housing disposed below said first seat;

said frame having a second crank housing disposed below said second seat;

a bottom connection tube connecting said first crank housing and said second crank housing, said bottom connection tube approximately parallel to said longitudinal axis; and, a down tube connected between said head tube and said bottom connection tube at a point between said first crank housing and said second crank housing.

3. A three-person bicycle according to claim 2, further including:

said cross bar having a center portion having a substantially circular cross section with a diameter of approximately 2.5 inches.

4. A three-person bicycle according to claim 2, said down tube forming an angle of approximately 25° with said cross bar.

5. A three-person bicycle according to claim 2, further including:

a first handle bar support for a person occupying said second seat; and, said first handle bar support movably connected to said cross bar, so that said first handle bar support may be longitudinally moved and locked in a desired position along said cross bar.

6. A three-person bicycle according to claim 2, further including:

a second handle bar support for a person occupying said third seat; and, said second handle bar support movably connected to said cross bar, so that said second handle bar support may be longitudinally moved and locked in a desired position along said cross bar.

7. A three-person bicycle according to claim 1, further including:

said first seat supported by a first seat post which is received by a first seat tube having a first angle A with horizontal;

said second seat supported by a second seat post which is received by a second seat tube having a second angle B with the horizontal, said second angle B less than said first angle A; and, said third seat supported by a third seat post received by a third seat tube having a third angle C with the horizontal, said third angle C less than said second angle B.

8. A three-person bicycle according to claim 7, wherein said first angle A is approximately 77°, said second angle B is approximately 75°, and said third angle C is approximately 73°.

9. A three-person bicycle according to claim 1, further including:

said frame having a cross bar oriented approximately parallel to said longitudinal axis;

said cross bar connected to a head tube disposed above said front wheel;

said frame having a first crank housing disposed below said first seat;

said frame having a second crank housing disposed below said second seat;

a bottom connection tube connecting said first crank housing and said second crank housing, said bottom connection tube approximately parallel to said longitudinal axis, said bottom connection tube having a central portion;

a down tube connecting said central portion of said bottom connection tube to said head tube;

a first handle bar support for a person occupying said second seat;

said first handle bar support movably connected to said cross bar, so that said first handle bar support may be longitudinally moved and locked in a desired position along said cross bar;

a second handle bar support for a person occupying said third seat;

said second handle bar support movably connected to said cross bar, so that said second handle bar support may be longitudinally moved and locked in a desired position along said cross bar;

said first seat supported by a first seat post which is received by a first seat tube having a first angle A with horizontal;

said second seat supported by a second seat post which is received by a second seat tube having a second angle B with the horizontal, said second angle B less than said first angle A; and, said third seat supported by a third seat post received by a third seat tube having a third angle C with the horizontal, said third angle C less than said second angle B.

10. A three-person bicycle, comprising:

a front wheel having a front axle;

a rear wheel having a rear axle;

a longitudinal axis passing between said front axle and said rear axle;

a frame connect ing said front wheel and said rear wheel;

a first seat longitudinally disposed upon said frame between said front axle and said rear axle;

a second seat longitudinally disposed upon said frame between said front axle and said rear axle, said second seat being behind said first seat;

a third seat longitudinally disposed upon said frame behind said rear axle, so that said third seat is located substantially behind said rear wheel; and, a first crank housing generally disposed below said first seat;

a second crank housing generally disposed below said second seat;

a third crank housing generally disposed below said third seat; and, said third crank housing substantially disposed behind said rear wheel.

* * * * *